United States Patent
Nicholds et al.

[15] 3,691,784
[45] Sept. 19, 1972

[54] CRYOGENIC REFRIGERATING APPARATUS

[72] Inventors: Kenneth Edmund Nicholds; Geoffrey Brian Longbottom, both of Redditch, England

[73] Assignee: The Hymatic Engineering Company Limited, Redditch, England

[22] Filed: Feb. 3, 1970

[21] Appl. No.: 8,181

[30] Foreign Application Priority Data

Feb. 3, 1969    Great Britain.........5,783/69

[52] U.S. Cl......................................62/218, 62/514
[51] Int. Cl..............................................F25b 19/00
[58] Field of Search............62/45, 51, 514, 218, 219

[56] References Cited

UNITED STATES PATENTS

| | | |
|---|---|---|
| 3,258,931 | 7/1966 | Kelly..........................62/514 |
| 3,307,367 | 3/1967 | Klipping......................62/45 |
| 2,945,354 | 7/1960 | Moskowitz....................62/51 |

FOREIGN PATENTS OR APPLICATIONS 1,448,137   6/1966   France.........................62/514

*Primary Examiner*—Meyer Perlin
*Attorney*—Watson, Cole, Grindle & Watson

[57] ABSTRACT

In a cryogenic refrigerating apparatus comprising a supply of refrigerating liquid in a Dewar flask, connected through a long flexible supply pipe to an evaporator for cooling a load, an injector being provided to deliver into the supply pipe a mixture of the liquid with gas from the ullage space in the top of the container. The evaporator is provided with a valve for automatically reducing the flow of refrigerant to it in response to the level of liquid in it.

5 Claims, 4 Drawing Figures

PATENTED SEP 19 1972 3,691,784
SHEET 2 OF 2

INVENTORS
KENNETH EDMUND NICHOLDS
GEOFFREY BRIAN LONGBOTTOM
BY
Watson, Cole, Grindle & Watson
ATTORNEY

CRYOGENIC REFRIGERATING APPARATUS

This invention relates to cryogenic refrigerating apparatus of the type comprising a supply vessel to contain a supply of refrigerant liquid, and an evaporator to be mounted in heat exchange relationship with a load to be cooled, and connected to the supply vessel by a supply pipe of substantial length for the supply of refrigerant liquid to it. In such apparatus, for example using a supply of liquid nitrogen, the liquid may be delivered through the supply pipe to the evaporator by closing the supply vessel, which may be a Dewar flask, so that leakage of heat into the refrigerant causes evaporation and rise of pressure in the supply vessel.

In such a system it is known to construct the parts so that comparatively rapid vaporization of a small portion of the refrigerant occurs as it passes from the supply vessel to the supply pipe, and this vapor forms a carrier for the remaining liquid refrigerant which breaks up into small droplets. These droplets are carried by the carrier gas along the supply pipe, which may be of polyvinyl chloride or similar material, and are prevented from wetting the walls of the supply pipe by the insulation provided by the gas, whilst if a droplet should touch the wall of the supply pipe a further gas film will immediately be produced by further partial evaporation.

According to the present invention the supply vessel is provided with an injector having a liquid inlet communicating with the vessel, below the liquid surface, and a gas inlet communicating with it above the liquid surface to produce a flow of gas entraining drops of liquid into the supply pipe. The gas inlet of the injector may be connected to the supply vessel through a pressure control device.

Preferably the supply vessel is also provided with a relief valve leading to an exhaust vent, so that if the pressure in the supply vessel rises above a predetermined value, gas will be allowed to escape.

Preferably the evaporator is provided with means responsive to the level of liquid refrigerant in it, for automatically reducing or cutting off the flow of refrigerant when the liquid in the evaporator rises above a given level. The evaporator will be provided with an exhaust passage for the escape of refrigerant gas and the flow of refrigerant may if desired be controlled by a valve in the exhaust passage. Alternatively the flow of refrigerant may be controlled by a valve in the inlet from the supply pipe to the evaporator.

The means for controlling the flow of refrigerant may include a temperature sensor in the region of the liquid surface and means for controlling the valve in accordance with the temperature of the sensor. The sensor may comprise a vapor bulb whereof the pressure acts on a bellows actuating the valve.

The invention may be put into practice in various ways but one specific embodiment will be described by way of example with reference to the accompanying drawings in which.

Figure 1:
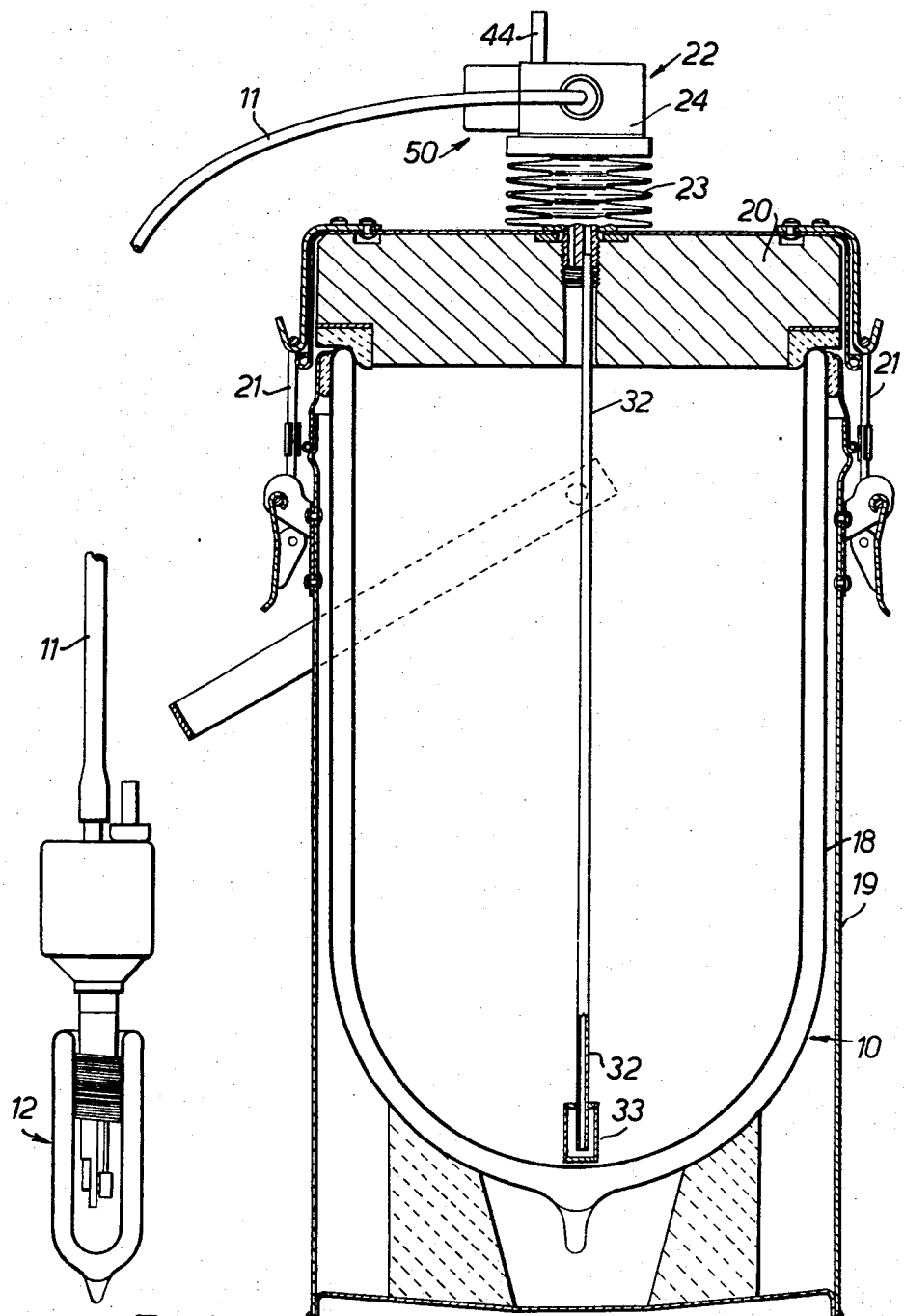
FIG. 1 is a general view, partly in section, of a cryogenic refrigerating system comprising a container for a supply of liquid nitrogen connected by a flexible supply pipe to an evaporator unit for cooling a load.

Briefly, as shown in FIG. 1, the system includes a supply of liquid nitrogen in a Dewar supply vessel 10, which is connected through a flexible supply pipe 11 of polyvinylchloride to an evaporator unit 12 which is in heat exchange relationship with the load, namely a radiation detector 15.

The supply vessel 10 comprises a Dewar flask 18 suitably mounted in an outer casing 19 and provided with an insulating lid 20 secured by clips 21.

Figure 2:
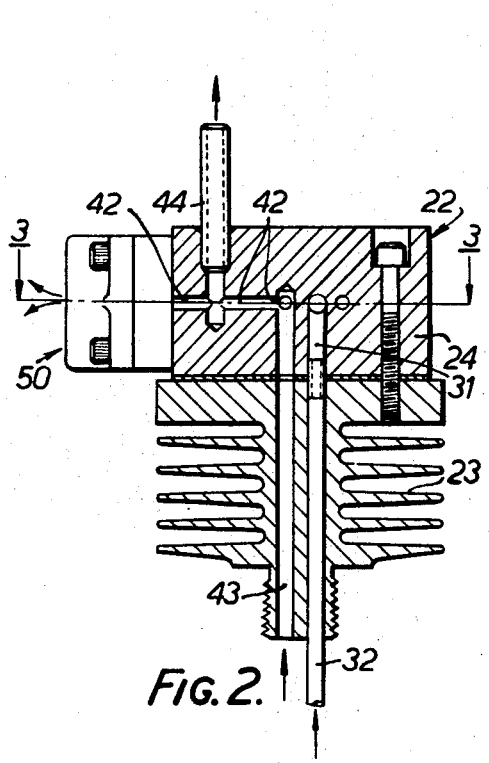
FIG. 2 is an enlarged sectional elevation of the injector unit on the supply container, in section on the line 2—2 of FIG. 3.
Figure 3:
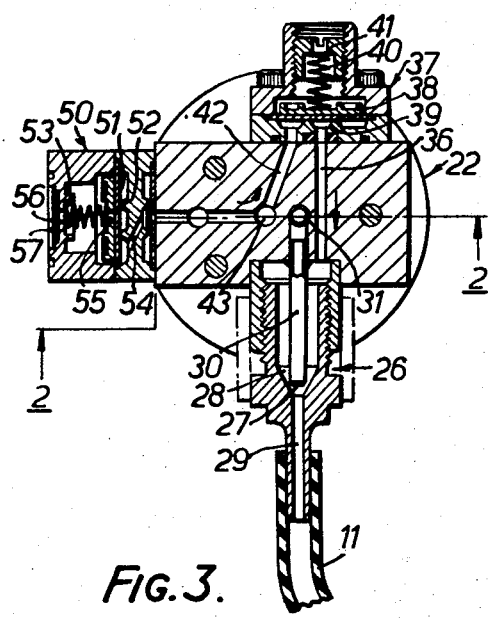
FIG. 3 is a sectional plan on the line 3—3 of FIG. 2.

Mounted in the middle of the lid is an injector unit 22 which also incorporates a pressure control device and is shown in more detail in FIGS. 2 and 3. Thus the injector unit has a body comprising a lower finned portion 23 and an upper portion 24 incorporating an injector 26 shown in FIG. 3. This comprises a liquid nozzle 27 separated by an annular gap from a converging gas chamber 28 to form an injector, the injector outlet 29 being connected to the flexible supply pipe 11 leading to the evaporator unit. As will be seen from FIG. 3 the liquid nozzle 27 is formed by the end of a horizontal pipe 30 communicating with a vertical passage 31, the lower end of which opens into a vertical liquid pipe 32 extending down to the bottom of the Dewar flask where it carries a filter 33.

The converging gas chamber 28 communicates through a horizontal passage 36 with a pressure control device 37. This includes a diaphragm 38 engaging an annular seating 39, with which it is pressed into contact by a helical compression spring 40 interposed between it and an adjusting screw 41 by which the pressure setting can be adjusted. The horizontal passage 36 communicates with the space within the annular seating, while the space outside the latter is connected by a horizontal passage 42 to a vertical passage 43 extending down through the injector unit and opening into the top of the Dewar flask 18 so as to be in communication with the ullage space above the liquid.

The horizontal passage 42 continues, to communicate through a vertical passage and pipe 44 to which a manometer can be connected (if a manometer is not connected the pipe 44 is closed) and to a pressure relief valve 50. This again comprises a diaphragm 51 pressed into contact with an annular seating 52 by a helical compression spring 53. The horizontal passage 42 communicates through an oblique passage 54 with the space surrounding the seating 52 while the space within the seating is connected through a hole 55 in the diaphragm to an exhaust outlet 56 which may contain a gauze 57.

Accordingly, as heat leaks into the Dewar supply vessel, vapor will be evaporated from the liquid nitrogen and the pressure will gradually rise. When it exceeds the pressure in the injector outlet 29 and flexible supply pipe 11, gas from the ullage space in the top of the supply vessel will pass through the vertical passage 43 into the converging gas chamber 28 of the injector, and by its injector action will draw liquid nitrogen up the vertical liquid pipe 32 and deliver a mixture of gas and liquid into the injector outlet 29 and flexible supply pipe 11. The mixture will travel through the flexible supply pipe, the vapor insulating the liquid droplets, in the manner already referred to above.

It will be appreciated that the pressure control device 37 ensures that the pressure of vapor reaching the converging gas chamber 28 is slightly lower than the pressure of liquid reaching it. This is to ensure that even when the Dewar flask 18 is nearly empty the liquid will flow up the pipe 32 against the small head of liquid in it. Thus the terms "injector" and "entrain" used herein are not intended to imply that the pressure of the gas is higher than that of the liquid at the injector, nor that it is the energy of the gas rather than that of the liquid that propels them along the pipe 11. The essential point is that the liquid should be accompanied by gas from the ullage space in the top of the container.

Figure 4:
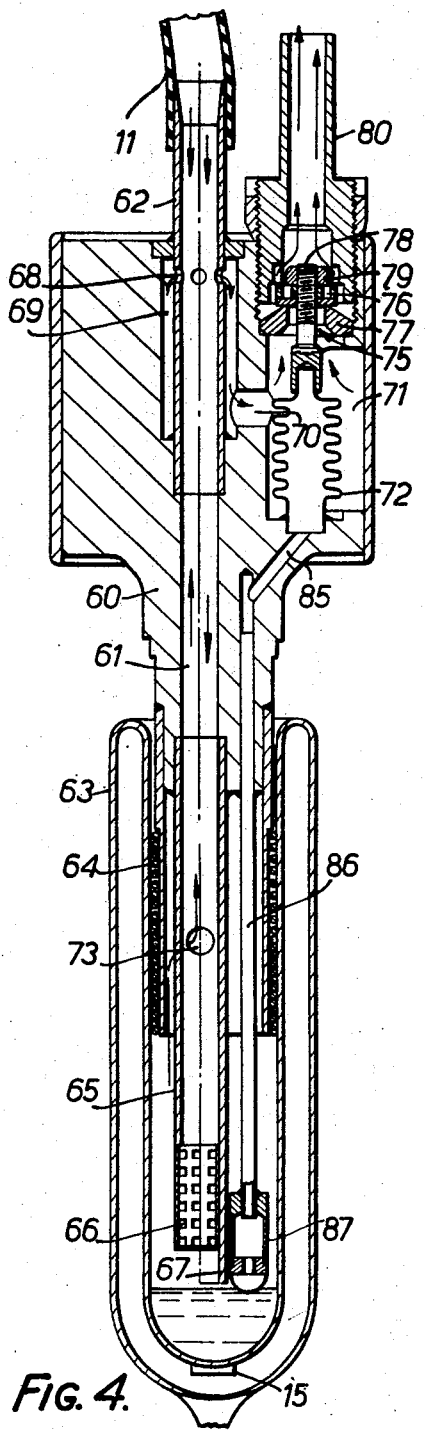
FIG. 4 is an enlarged sectional elevation of the evaporator unit.

FIG. 4 shows the evaporator unit.

This comprises a body 60 having in it a vertical passage 61 the upper end of which is continued in an inlet pipe 62 connected to the outlet end of the flexible supply pipe 11 through which the mixture of nitrogen liquid and gas enters the evaporator unit. The lower end of the body fits into a Dewar flask 63 having the radiation detector 15 formed or secured on the outer face of the inner wall at the bottom. The space between the body and the Dewar flask is packed and sealed by a winding of polyester thread 64. At its lower end the passage 61 is continued in a pipe 65 extending down, past holes 73 referred to below, to a point near the bottom of the Dewar flask, where it is provided with a strainer and baffle 66 and is extended, on one side only, to form a shield 67 to shield a sensor, referred to below, from direct impingement by the issuing liquid.

Just below the top of the body 60, the inlet pipe 62 is formed with a number of holes 68 opening into an annular chamber 69 connected by a passage 70 to a bellows chamber 71 containing a bellows 72.

At the upper end of the bellows chamber is an exhaust regulating valve 75 comprising a valve head 76 engaging a seating 77 and carried by a stem 78 the lower end of which is secured to the closed upper end of the bellows 72. The head 76 is adjustably secured to the stem with the aid of a nut 79. The valve leads to a vertical exhaust outlet 80.

The open lower end of the bellows is connected through a passage 85 and a pipe 86 to a sensor bulb 87 situated near the lower end of the Dewar flask slightly below the strainer and baffle 66. The sensor bulb and bellows are filled with a suitable liquid in equilibrium with its vapor.

Accordingly in operation a mixture of nitrogen liquid and gas enters the evaporator unit from the supply pipe 11 and travels down the inlet pipe 62. The gas escapes through the holes 68 into the annular chamber 69. The liquid flows down to the bottom of the pipe 65 and out into the Dewar flask forming a pool in the bottom of the latter. The heat leaking into the evaporator unit and that resulting from cooling of the load evaporates some of the liquid and the gas returns upwards, in through the holes 73 and back up the pipe 65 and passage 61 and again escapes through the holes 68 into the annular chamber 69. From the annular chamber 69 the gases flow into the bellows chamber 71 and escape to exhaust past the exhaust regulating valve 75.

When the pool of liquid in the bottom of the Dewar flask reaches the sensor bulb 87 the temperature of the latter is sharply reduced and the pressure in the bellows is accordingly reduced so as to tend to close the exhaust regulating valve 75 and prevent exhaust of the gas. This raises the pressure in the whole evaporating unit and restricts the supply of further nitrogen through the flexible supply pipe 11.

Accordingly the evaporator unit will automatically accept from the supply vessel only enough liquid nitrogen to maintain a suitable small pool of liquid in the bottom of the Dewar flask 63.

It will be appreciated that the invention is not restricted to the details of the specific embodiment described. In one modification, not illustrated, the regulation of the supply is effected by a valve controlling the entry of nitrogen gas and liquid through the inlet pipe 62 to the evaporator unit, instead of controlling the exhaust from that unit. In addition if desired the supply vessel may be provided with a throttling valve, for example an adjustable needle valve, to control the flow of gas to the injector progressively in accordance with the pressure in the flexible supply pipe.

Moreover in the evaporator the details of the valve, the bellows and the sensing bulb may vary; for example they may be as in any of the arrangements described in U.S. Pat. No. 3,517,525, commonly owned herewith.

In particular it may be desirable to give the valve a substantially snap action in order to obtain efficient transfer of refrigerant liquid, in which case the sensing bulb may be extended horizontally so that a small change of liquid level brings the liquid into contact with a large area of it. Alternatively or in addition a differential or snap action of the valve may be obtained mechanically by means of springs, such as Belleville washers, or by permanent magnets.

On the other hand, if a more progressive action is required the sensor may be provided with a downwardly extending tail of conducting material so that the temperature of the vapor in it falls gradually as the path for the flow of heat gradually shortens.

The evaporator exhaust outlet 80 may exhaust to the atmosphere or return the nitrogen to effect cooling or to be reliquified.

The arrangement described effects economy of the refrigerant liquid particularly in two ways. In the first place by controlling the demand for refrigerant in accordance with the level in the evaporator it provides sufficient cooling when ambient or load conditions are such as to require the maximum cooling, while avoiding waste of refrigerant when the ambient conditions or load conditions require less cooling. Secondly by employing an injector it makes use of ullage gas, which would otherwise be exhausted to atmosphere and wasted, in order to provide the self-insulating gas for conveying the liquid through the supply pipe. Thus the fins of the lower body portion 23 are not generally required to ensure that the liquid flowing out of the supply vessel into the supply pipe will pick up heat in order to evaporate some of it, the necessary vapor for this purpose being obtained, as described, from the ullage space of the supply vessel. The fins are, however, preferably provided to avoid trouble due to freezing of moisture from the atmosphere.

What we claim as our invention and desire to secure by Letters Patent is:

1. Cryogenic refrigerating apparatus of the type comprising a supply vessel to contain a supply of refrigerating liquid, and an evaporator to be mounted in heat exchange relationship with a load to be cooled, and connected to the supply vessel by a supply pipe of substantial length for the supply of refrigerant liquid to it, in which the supply vessel is provided with an injector having a liquid inlet communicating with the vessel below the liquid surface, and a gas inlet communicating through a pressure control device with a point in the supply vessel above the liquid surface to produce a flow of gas entraining drops of liquid into the supply pipe.

2. Apparatus as claimed in claim 1 in which the supply vessel is provided with a relief valve leading to an exhaust vent, so that if the pressure in the supply vessel rises above a predetermined value, gas is allowed to escape.

3. Cryogenic refrigerating apparatus comprising a supply vessel to contain a supply of refrigerating liquid, an evaporator to be mounted in heat exchange relationship with a load to be cooled, a supply pipe of substantial length connecting the supply vessel to the evaporator for the supply of refrigerant liquid to the latter, said pipe forming the sole connection between the supply vessel and the evaporator, and means including a valve adjacent the evaporator responsive to the level of liquid refrigerant in it, for automatically reducing or cutting off the flow of refrigerant when the liquid in the evaporator rises above a given level, without relying on lowering the pressure in the supply vessel, and an injector having a liquid inlet communicating with the supply vessel below the liquid surface and a gas inlet communicating with it above the liquid surface to produce a flow of gas entraining drops of liquid into the supply pipe.

4. Apparatus as claimed in claim 3 including a venting device situated adjacent that end of the supply pipe which is adjacent the load and comprising a vented annular chamber surrounding the supply pipe and communicating with its interior through a number of perforations formed in its wall and distributed around its periphery.

5. Apparatus as claimed in claim 4 in which the supply pipe extends vertically where it passes through the annular chamber.

* * * * *